US008970580B2

(12) United States Patent
Jang et al.

(10) Patent No.: US 8,970,580 B2
(45) Date of Patent: Mar. 3, 2015

(54) METHOD, APPARATUS AND COMPUTER-READABLE MEDIUM RENDERING THREE-DIMENSIONAL (3D) GRAPHICS

(75) Inventors: Gyeong Ja Jang, Yongin-si (KR); Seok Yoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 828 days.

(21) Appl. No.: 12/860,479

(22) Filed: Aug. 20, 2010

(65) Prior Publication Data

US 2011/0199377 A1 Aug. 18, 2011

(30) Foreign Application Priority Data

Feb. 12, 2010 (KR) .................. 10-2010-0013432

(51) Int. Cl.
G06T 15/00 (2011.01)
G06T 15/20 (2011.01)
(52) U.S. Cl.
CPC ............... *G06T 15/005* (2013.01); *G06T 15/20* (2013.01)
USPC ........................................................ 345/419
(58) Field of Classification Search
CPC .................................................... G06T 15/005
USPC ........................................................ 345/419
See application file for complete search history.

(56) References Cited

U.S. PATENT DOCUMENTS

| 6,195,098 | B1 | 2/2001 | Brittain et al. | |
|---|---|---|---|---|
| 2007/0097138 | A1* | 5/2007 | Sorotokin et al. | 345/581 |
| 2007/0182748 | A1* | 8/2007 | Woo | 345/506 |
| 2010/0021060 | A1* | 1/2010 | Bissonnette et al. | 382/180 |
| 2010/0060630 | A1* | 3/2010 | Nystad et al. | 345/419 |
| 2010/0095236 | A1* | 4/2010 | Silberstein et al. | 715/781 |

FOREIGN PATENT DOCUMENTS

| JP | 2002-15328 | 1/2002 |
|---|---|---|
| JP | 2005-504363 | 2/2005 |
| KR | 2001-0047622 | 6/2001 |
| KR | 10-2006-0090153 | 8/2006 |
| KR | 10-0682456 | 2/2007 |
| KR | 10-2009-0065353 | 6/2009 |

* cited by examiner

*Primary Examiner* — Kee M Tung
*Assistant Examiner* — Ryan D McCulley
(74) *Attorney, Agent, or Firm* — NSIP Law

(57) ABSTRACT

Provided is an apparatus, method and computer-readable medium rendering three-dimensional (3D) graphics. The 3D graphics rendering apparatus, method and computer-readable medium may predict a screen area to be updated in a subsequent frame based on at least one of object information of a current frame, rendered data of the current frame, and object information of the subsequent frame, and may extract rendering data of the predicted screen area from one of the current frame and the subsequent frame.

33 Claims, 14 Drawing Sheets

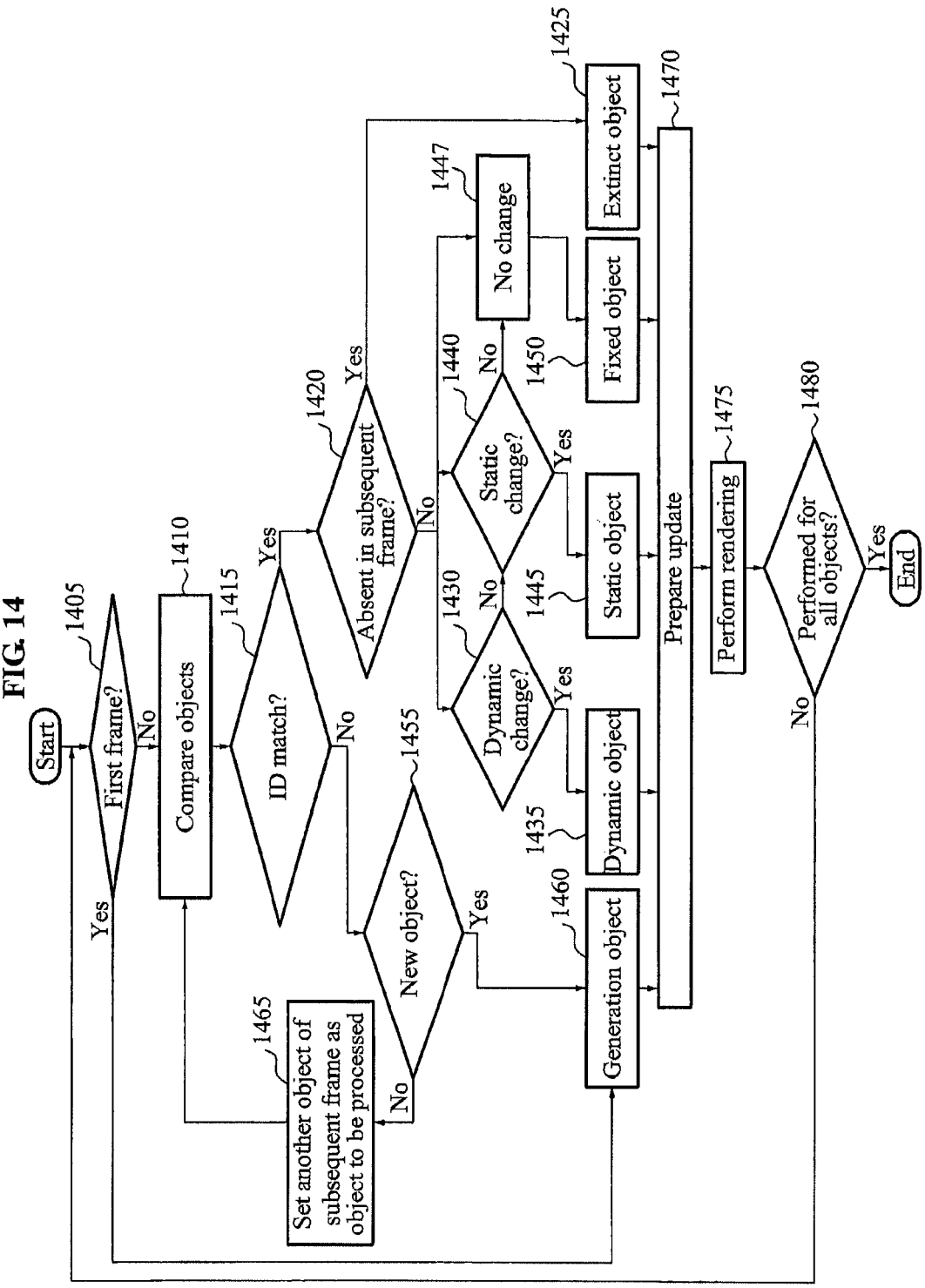

METHOD, APPARATUS AND COMPUTER-READABLE MEDIUM RENDERING THREE-DIMENSIONAL (3D) GRAPHICS

CROSS-REFERENCE TO RELATED APPLICATIONS

This application claims the benefit of Korean Patent Application No. 10-2010-0013432, filed on Feb. 12, 2010, in the Korean Intellectual Property Office, the disclosure of which is incorporated herein by reference.

BACKGROUND

1. Field

Example embodiments relate to a method, apparatus and computer-readable medium rendering three-dimensional (3D) graphics, and more particularly, to a method, apparatus and computer-readable medium rendering 3D graphics that may predict and render an update area of a subsequent frame and thereby enhance a rendering efficiency.

2. Description of the Related Art

A device displaying three-dimensional (3D) graphics data may be used, for example, in a user interface (UI) application in a mobile device, an e-book application, an application for product simulation used in an internet shopping mall, and the like.

The aforementioned applications may use quick rendering. Partial change may frequently occur in most scenes displayed by the applications. For example, when a plurality of icons is arranged in a matrix form on a mobile device, a user may move only a single row or a single column and thus icons located in a remaining column or row may not be changed.

However, when a scene is changed, existing 3D rendering technology may render all the 3D graphics data of the changed scene. Accordingly, when a user shifts, icons to the left or the right which are included in a single row, the mobile device may render and display all the non-shifted icons included in other rows. In conventional art, whenever a scene is changed, all 3D graphics data may be rendered. Since an operation may be repeatedly performed until all the 3D graphics data is rendered and displayed, a great amount of time and large memory space may be unnecessarily used.

SUMMARY

The foregoing and/or other aspects are achieved by providing an apparatus rendering three-dimensional (3D) graphics, including a rendering unit to generate rendered data of a current frame based on rendered data of a previous frame, and an update preparation unit to predict a screen area to be updated in a subsequent frame based on at least one of object information associated with objects forming the current frame, the rendered data of the current frame, and object information of the subsequent frame, and to extract, from one of the current frame and the subsequent frame, rendering data of the predicted screen area. The rendering unit may render the extracted rendering data to generate the predicted screen area to be updated in the subsequent frame.

The object information may include at least one of an object identifier (ID), an object type, object data, and change information of the object data.

The update preparation unit may include an update predictor to predict, from the rendered data of the current frame, an update area corresponding to an object to be processed among the objects of the current frame, when the object to be processed corresponds to a dynamic object of which one of coordinates, a location, and a rotation varies, and a data preparation unit to extract rendering data of the update area from one of the current frame and the subsequent frame.

When the object to be processed corresponds to an object present in the current frame and absent in the subsequent frame, the update predictor may remove the object to be processed from objects included in the update area. The data preparation unit may extract, from one of the current frame and the subsequent frame, the rendering data of the update area in which the object to be processed is removed.

The rendering unit may perform rasterization of the rendering data extracted by the data preparation unit.

When the object to be processed corresponds to a dynamic object having geometry data that varies in the subsequent frame, the update predictor may calculate an area of the object to be processed in the subsequent frame based on change information of the object to be processed. The data preparation unit may extract rendering data of the calculated area from one of the current frame and the subsequent frame.

The rendering unit may perform geometry processing and rasterization of data based on the rendering data extracted by the data preparation unit and change information of the object to be processed.

The change information of the object to be processed may include one of animation path information and transformation information indicating a change between the current frame and the subsequent frame.

The 3D graphics rendering apparatus may further include a storage to store the geometrically processed data.

The 3D graphics rendering apparatus may further include an area distributer to classify the geometrically processed data into areas by performing tile binning of the geometrically processed data, and to output the classified geometrically processed data to the storage.

The update preparation unit may include an update predictor to predict, from the rendered data of the current frame, an update area corresponding to an object to be processed among the objects of the current frame, when the object to be processed corresponds to a static object of which one of a color, a texture, and a brightness varies, and a data preparation unit to extract rendering data of the update area from one of the current frame and the subsequent frame.

The update predictor may retrieve an area including the static object from the rendered data of the current frame, and predict the retrieved area as the update area.

The rendering unit may perform one of lighting and rasterization and rasterization, of the rendering data extracted by the data preparation unit.

The rendering data may be applied to one of an object-based rendering scheme of performing rendering based on an object unit and an area and a tile-based rendering scheme of gathering geometrical processing results of the objects, to perform rendering for each area.

The update preparation unit may include an update predictor to determine, as a dynamic object, an object absent in the current frame and newly generated in the subsequent frame, and to predict an update area of the subsequent frame based on change information of an object of the subsequent frame, and a data preparation unit to extract, from the subsequent frame, and prepare rendering data of the predicted update area.

The update predictor may determine, as a generation object, an object newly generated in the subsequent frame, and calculate an area of the generation object in the subsequent frame based on change information of the object of the subsequent frame. The data preparation unit may extract rendering data of the calculated area from the subsequent frame.

The rendering unit may perform geometry processing and rasterization of data based on the rendering data extracted by the data preparation unit and change information of the object to be processed.

An area corresponding to a fixed object may reuse the rendered data of the previous frame.

The update preparation unit may compare an object to be processed in the subsequent frame with an object processed in the current frame based on object information and scene information to classify a type of the object to be processed.

The foregoing and/or other aspects are achieved by providing a method of rendering 3D graphics, including receiving a current frame and object information associated with objects forming the current frame, generating rendered data of the received current frame based on rendered data of a previous frame, predicting a screen area to be updated in the subsequent frame, based on at least one of the received object information of the current frame, the rendered data of the current frame, and object information of the subsequent frame, extracting, from one of the current frame and the subsequent frame, rendering data of the predicted screen area, and rendering the extracted rendering data to generate the predicted screen area to be updated in the subsequent frame.

The predicting may include predicting, from the rendered data of the current frame, an update area corresponding to an object to be processed among the objects of the current frame, when the object to be processed corresponds to a dynamic object of which one of coordinates, a location, and a rotation varies.

The predicting may include removing the object to be processed from objects included in the update area when the object to be processed corresponds to an object present in the current frame and absent in the subsequent frame. The extracting may include extracting, from one of the current frame and the subsequent frame, the rendering data of the update area in which the object to be processed is removed.

The rendering may include performing rasterization of the extracted rendering data.

The predicting may include calculating an area of the object to be processed in the subsequent frame based on change information of the object to be processed, when the object to be processed corresponds to a dynamic object of which geometry data varies in the subsequent frame. The extracting may include extracting rendering data of the calculated area from one of the current frame and the subsequent frame.

The rendering may include performing geometry processing and rasterization of data based on the extracted rendering data and change information of the object to be processed.

The predicting may include retrieving, from the rendered data of the current frame, an area including a static object of which one of a color, a texture, and a brightness varies, when the object to be processed corresponds to the static object, and predicting the retrieved area as the update area.

The rendering may include either performing one of lighting and rasterization and performing rasterization, of the extracted rendering data.

The predicting may include determining, as a dynamic object, an object absent in the current frame and newly generated in the subsequent frame, to predict an update area of the subsequent frame based on change information of an object of the subsequent frame.

The predicting may include determining, as a generation object, an object newly generated in the subsequent frame to calculate an area of the generation object in the subsequent frame based on change information of the object of the subsequent frame. The extracting may include extracting, from the subsequent frame, rendering data of the calculated area.

The rendering may include performing geometry processing and rasterization of data based on the extracted rendering data and change information of the object to be processed.

An area corresponding to a fixed object may reuse the rendered data of the previous frame.

The 3D graphics rendering method may further include comparing an object to be processed in the subsequent frame with an object processed in the current frame based on object information and scene information to classify a type of the object to be processed.

According to example embodiments, instead of clearing the entire buffer whenever a new frame is input, the entire buffer may be cleared when a first frame is input. Accordingly, it is possible to reduce a time used for buffer clear.

According to example embodiments, a buffer clear area may be reduced by storing, for each area, data to be stored in a corresponding buffer.

According to example embodiments, it is possible to reduce an amount of time and an amount of calculation used for buffer clear and rendering by predicting an update area of a subsequent frame, by clearing only a buffer corresponding to the predicted update area, and by rendering object data corresponding to the update area.

According to example embodiments, since only an update area may be rendered and a remaining area may be displayed on a screen using a previous rendering result, it is possible to reduce a rendering area and enhance a rendering processing rate.

According to another aspect of one or more embodiments, there is provided at least one computer readable medium including computer readable instructions that control at least one processor to implement methods of one or more embodiments.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 illustrates an example of predicting an update area in an area where type C of a dynamic object is present according to example embodiments;

FIG. 3 illustrates an example of predicting an update area in an area where type B of a dynamic object is present according to example embodiments;

FIG. 4 illustrates an example of predicting an update area in an area where a static object is present according to example embodiments;

FIG. 5 illustrates an example of predicting an update area in an area where a static object exists according to example embodiments;

FIG. 14 illustrates a method of classifying an object type according to example embodiments.

DETAILED DESCRIPTION

Figure 1:
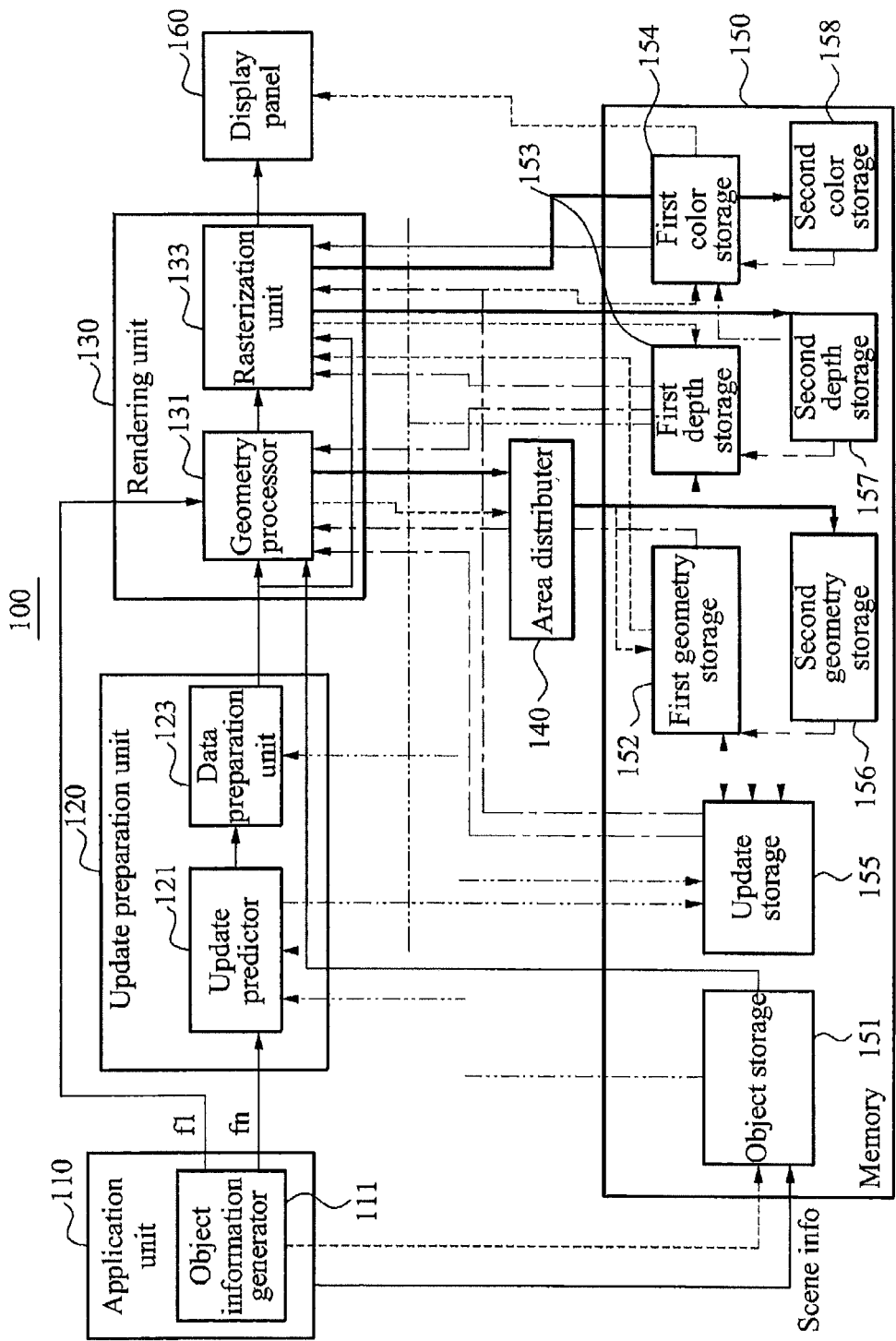
FIG. 1 illustrates a three-dimensional (3D) graphics rendering apparatus according to example embodiments.

Reference will now be made in detail to the embodiments, examples of which are illustrated in the accompanying drawings, wherein like reference numerals refer to like elements throughout. The embodiments are described below to explain the present disclosure by referring to the figures.

Throughout the present specification, "rendered data" indicates data rendered, "rendering data" indicates data to be rendered, and "update area" indicates an area to be updated.

FIG. 1 illustrates a three-dimensional (3D) graphics rendering apparatus 100 according to example embodiments.

Referring to FIG. 1, the 3D graphics rendering apparatus 100 may include an application unit 110, an update preparation unit 120, a rendering unit 130, an area distributer 140, and a memory 150.

A narrow dotted line, for example, a line between an object information generator 111 and an object storage 151 shows a data flow of a first frame, a frame currently processed, or a subsequent frame.

A single alternate dotted line, for example, a line between a geometry processor 131 and a first geometry storage 152 shows a flow of data input into the rendering unit 130 in a second frame or a subsequently processed frame. A double alternate dotted line, for example, a line between an update predictor 121 and the object storage 151 shows a flow of input data of the second frame or the subsequently processed frame.

A bold solid line, for example, a line between the geometry processor 131 and the area distributer 140 shows a flow of data output from the rendering unit 130. A wide interval line, for example, a line between a first color storage 154 and a second color storage 158 shows movement of data to be updated as data corresponding to an update area.

The application unit 110 may generate and output 3D graphics data based on, for example a frame unit. The object information generator 111 may generate object information associated with objects forming each frame. An object may be a polygon displayed on a screen, such as a circular cylinder, a hexahedron, and a sphere. The object may be a polygon generated using a modeling tool. The generated object information may be stored in the object storage 151 of the memory 150 based on a frame unit.

The object information may include at least one of an object identifier (ID), object data, an object type, change information of each object, for example, geometric object data change or color data change, and data used for color calculation. The object data may include, for example, coordinates of a vertex, a normal vector, texture coordinates, texture, color, and the like with respect to each of objects forming a frame. The object type may include a dynamic object, a static object, a fixed object, a generation object, and an extinct object.

Scene information may include a number of frames, viewpoint change information, a scene graphic, a shader program, and the like.

The dynamic object may denote an object where an animation having change information or a path is applied and thus coordinates, a location, or a rotation of the dynamic object may vary in a subsequent frame. An object dynamically changing and having a changing color value may also be included in the dynamic object. The static object may denote an object of which coordinates, a location, or a rotation does not vary, however, of which a material, a color, a texture, or a brightness varies in the subsequent frame. The fixed object may denote an object maintained in the subsequent frame without any change.

The generation object may denote an object absent in a current frame that is a current input frame, and added in the subsequent frame. The generation object may become the fixed object, the dynamic object, or the static object in the subsequent frame.

The extinct object may denote an object present in the current frame and absent in the subsequent frame. The fixed object, the dynamic object, or the static object may become the extinct object in the subsequent frame.

A method of classifying the object may be performed by the application unit 110 or a separate block before the update predictor 121 included in the update preparation unit 120. A method of classifying an object type will be described with reference to FIG. 14.

The change information may include information regarding coordinates, a location, or a rotation of an object varying in the subject frame, and may be expressed as transformation information, for example, a matrix or a vector, or as an animation path. When the object is displayed at a different location in the subsequent frame, the animation path may include information associated with a moved path, and may be expressed by a key and a key value. Here, the key denotes a time and the key value denotes a value at a point of k, for example, a coordinate value. The change information may also include data used to change a color value.

The data used for color calculation may denote data used to change a color and thus may include texture information, lighting information, a variable, or a constant.

When a frame initially output from the application unit 110 corresponds to a first frame f1, buffers of the memory 150 may be cleared by a controller (not shown).

The rendering unit 130 may generate rendered data by rendering application data forming the first frame f1, for example, 3D object data. For rendering, the rendering unit 130 may include the geometry processor 131 and a rasterization unit 133.

Although not illustrated, the geometry processor 131 may include a geometry calculator of a fixed pipeline or a vertex shader portion of a programmable shader pipeline. The rasterization unit 133 may include a rasterization unit of the fixed pipeline or a fragment shader portion of the programmable shader pipeline. 3D object data may be vertex data of a 3D triangle.

The geometry processor 131 may generate geometric object data by performing geometry processing of the first frame f1. The geometry processor 131 may generate the geometric object data, that is, 2D triangle data having a depth value by transforming, lighting, and viewport mapping all the 3D objects of the first frame f1. Hereinafter, the geometric object data is referred to as geometry data.

The rasterization unit 133 may calculate a depth value and a color value of each pixel forming the first frame f1 by performing rasterization of 2D triangle data having a depth value input from the geometry processor 131, for example, vertex data of a triangle. The depth value of each pixel may be determined through depth comparison between fragments. The depth comparison may be performed by the geometry calculator 131 or by the rasterization unit 133. A rendered pixel may be displayed on a display panel 160.

The area distributer 140 may divide the geometry data into areas by performing tile binning of the geometry data. Specifically, the area distributer 140 may perform cross inspection with respect to the geometry data and a screen area divided based on a tile unit, and may verify geometry data belonging to each screen area. Each classified screen area (hereinafter, "area") and geometry data included in each corresponding area may be stored in the first geometry storage 152. The geometry data may be divided and be stored for each area to reduce a buffer area to be cleared, that is, an update area when a subsequent frame is rendered.

The memory 150 may store data generated by the 3D graphics rendering apparatus 100. Storages 151, 152, 153, 154, 155, 156, 157, and 158 of the memory 150 may be physically different from each other, or may be located in a single storage medium. The memory 150 may logically include the storages 151-158.

The object storage 151 may store object information and scene information of each frame input from the application unit 110.

The first geometry storage 152 may store, for each area, geometry data of a current frame or the first frame f1 distributed by the area distributer 140. The first geometry storage 152 may be a geometry buffer, and may store geometry data for each area of the first frame f1 or the current frame. Information stored in the first geometry storage 152 may include at least one of an ID of each area, coordinates of each area, a size of each area, data of a 2D triangle with a depth value located in each area, object data for lighting and rasterization, an object ID of an object located in each area, an object type, and change information of the object in the subsequent frame. Here, the change information may include transformation information, animation path information, or color data change information.

The first depth storage 153 may store a depth value of each pixel of the first frame f1 generated by the geometry processor 131 or the rasterization unit 133. The first color storage 154 may store a color value of each pixel of the first frame f1 generated by the rasterization unit 133. The first depth storage 153 may include a depth buffer storing the depth value, and the first color storage 154 may include a color buffer storing the color value. The depth value and the color value of the first frame f1 or the current frame to predict an update area may be stored in the first depth storage 153 and the first color storage 154.

The update storage 155 may store information associated with the update area predicted by the update preparation unit 120 and rendering data of the update area. Information associated with the update area may include at least one of an ID of the update area, a size of the update area, coordinates of the update area, a change of the update area, an object ID of an object belonging to the update area, object data, change information, and data used for color calculation. Area information, particularly, object data included in a corresponding area, stored in the update storage 155 may be rendered by the rendering unit 130, and be used as rendering data of the update area. For example, random data stored in the first geometry storage 152, the first depth storage 153, or the first color storage 154 may be reused as rendering data of the update area.

The second geometry storage 156 may store geometry data of a second frame f2 or a subsequent frame. In the second frame f2, object data of an area where a change occurs based on the first frame f1 may be newly geometrically processed by the geometry processor 131, and an area where the change does not occur may reuse geometry data of the first frame f1. The second geometry storage 156 may store geometry data for each area of the second frame f2 or the subsequent frame.

The second depth storage 157 may store a rasterization result, for example, a depth value with respect to object data of the update area. The second color storage 158 may store a rasterization result, for example, a color value with respect to object data of the update area.

A stencil value storage (not shown) may have a one-byte value per pixel, and may be used for raster calculation together with the depth buffer and the color buffer.

The second frame f2 may copy only a rendering result, for example, the color value of the update area among rendering results of the first frame f1, and may display the copied rendering results on a liquid crystal display (LCD) panel.

When a third frame f3 is input, data of the first geometry storage 152 may be updated with geometry data of the second frame f2 stored in the second geometry storage 156. Data of the first depth storage 153 may be updated with a depth value of the second frame f2 stored in the second depth storage 157. Data of the first color storage 154 may be updated with a color value of the second frame f2 stored in the second color storage 158.

Hereinafter, a process of predicting and rendering an update area of a subsequent frame using a current frame when the subsequent frame is input will be described. Hereinafter, the first frame f1 may be referred to as the current frame f1, and the second frame f2 may be referred to as the subsequent frame f2.

Object information associated with objects forming the current frame f1 may be stored in the object storage 151. Geometry data, a depth value, and a color value may be stored in the first geometry storage 152, the first depth storage 153, and the first color storage 154.

The application unit 110 may output object information associated with objects forming the second frame f2.

The update preparation unit 120 may predict a screen area or a tile to be updated in the subsequent frame f2, based on at least one of object information of the current frame f1, rendered data of the current frame, and object information of the subsequent frame f2, and may extract, from the current frame f1 or the subsequent frame f2, object data to be rendered in the predicted screen area or tile. The update preparation unit 120 may include the update predictor 121 and a data preparation unit 123.

The update predictor 121 may read object information of the current frame f1 or object information of the subsequent frame f2 stored in the object storage 151, and may predict the update area based on an object unit. The update predictor 121 may predict the update area based on an object type. An object ID of an object to be processed, an object type, object data, data used for color calculation, or change information may be input from the object storage 151 into the update predictor 121. Geometry data of the current frame f1 may be input from the first geometry storage 152. The change information may include geometry data change information or color data change information.

The input geometry data of the current frame f1 may include an ID of each area, a size of each area, coordinates of each area, an area type, object data intersecting each area, an object ID, change information, or data used for color calculation.

Information of the update area may be used as information to update only a predicted area. Information of the update area may include at least one of an ID of the update area, a size of the update area, coordinates of the update area, object data intersecting the update area, an object ID, change information, and data used for color calculation.

When the object to be processed among the objects of the current frame f1 corresponds to a fixed object, the update predictor 121 may determine an area corresponding to the object to be processed as an area to be maintained in the subsequent frame f2, and may predict an update area of a subsequent object.

Also, the fixed object may not be changed in the subsequent frame f2. Accordingly, when displaying the fixed object on the display panel 160, pre-calculated geometry data or a pre-calculated color value and depth value of the current frame f1 may be reused.

Table 2 below classifies, into types A, B, and C, types of object data to be updated in an update area.

When the object to be currently processed among the objects of the current frame f1 corresponds to a dynamic object, and when it is verified that geometry data varies in the subsequent frame f2, the update predictor 121 may determine a type of the object to be processed as type C. When change information of the object exists, the update predictor 121 may determine the object to be processed as an object to be displayed at a different location in the subsequent frame f2.

The update predictor 121 may retrieve, from the geometry data of the current frame f1, an area including the object to be processed, that is, the dynamic object, and may retrieve, from the subsequent frame f2, an area to display the object to be processed based on the change information. The update predictor 121 may determine the retrieved area as the update area, and may predict the determined update area from the geometry data of the current frame.

Specifically, when change information of the object to be processed corresponds to transformation information, the update predictor 121 may calculate coordinates of the object in the subsequent frame based on the transformation information. The update predictor 121 may calculate an intersecting area by projecting the calculated coordinates to the current frame f1. Accordingly, the calculated intersecting area may be an update area. Also, rendering data of an area including a disappearing object, for example, rendering data of an area of the current frame including the dynamic object is related to type B and related descriptions will be made later.

The data preparation unit 123 may extract rendering data to be rendered in the current frame f1 or the subsequent frame f2, based on information of the intersecting area calculated by the update predictor 121. Although information of the intersecting area exists in the current frame f1, the dynamic object may include an object of which coordinates, a location, or a rotation varies. Accordingly, the data preparation unit 123 may calculate and extract the 3D object data by applying transformation information to geometry calculation result coordinates in the current frame.

Figure 2:
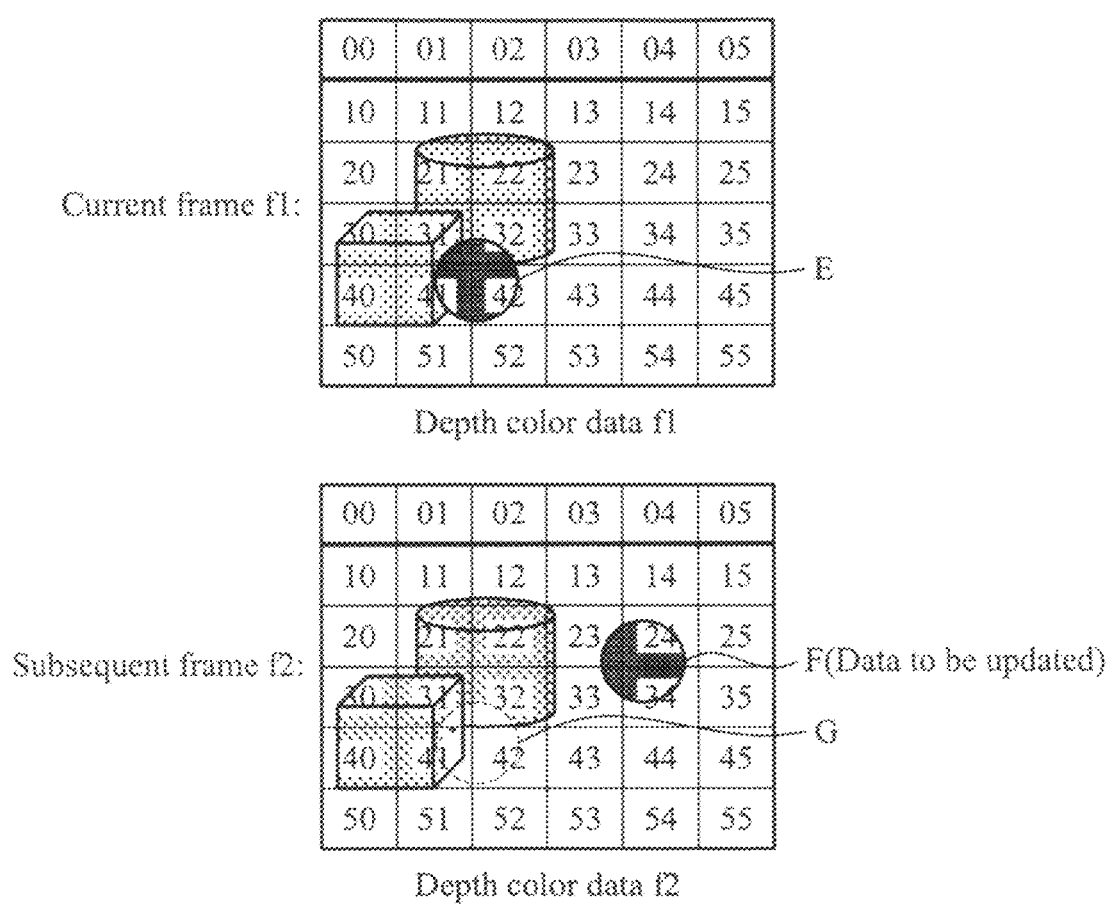

FIG. 2 illustrates an example of predicting an update area in an area where type C of a dynamic object is present according to example embodiments. Referring to FIG. 2, in a current frame f1 and a subsequent frame f2, the type C of the dynamic object is provided in spheres E and F. The sphere E is absent in the subsequent frame f2, which is indicated as a dotted circle G, and a location of the sphere E is changed to a location of the sphere F. Change information of the object to be processed may be used when the sphere E moves to the location of the sphere F.

The update predictor 121 may determine that the sphere E of the current frame f1 may move to areas 23, 24, 33, and 34 of the subsequent frame f2 based on change information, and may predict that the areas 23, 24, 33, and 34 may be updated.

Since object data information included in information associated with the predicted areas 23, 24, 33, and 34 matches information of the sphere E, the data preparation unit 123 may obtain, from rendered data of the current frame f1, an area ID, a size, and coordinates of each predicted area, an area type, object data intersecting each area, color change information that is data used for color calculation, and transformation information. The intersecting object data may be object data of the sphere E displayed on the current frame f1.

The update predictor 121 may predict, based on change information of the areas 23, 24, 33, and 34, that the sphere F is absent in the current frame f1, however, may be added in the subsequent frame f2. The data preparation unit 123 may prepare rendering data by extracting, from the subsequent frame f2, 3D object data located in the predicted areas 23, 24, 33, and 34. The prepared 3D object data may include at least one of an object ID, an object type, change information, and information used for color calculation.

In the case of the type C of the dynamic object, a location of object data, a rotation, coordinates, and color data may vary. Accordingly, the rendering unit 130 may perform rendering data, i.e., transformation, lighting, viewport mapping, and rasterization of the extracted 3D object data.

When the object to be processed among objects of the current frame f1 is verified as the dynamic object, the update predictor 121 may determine an area corresponding to the object to be processed as an update area, and may predict the update area from geometry data of the current frame f1.

Specifically, the update predictor 121 may receive, from the object storage 151, a type of the object to be processed, that is, the dynamic object, object data, or change information, and may receive the geometry data of the current frame f1 from the first geometry storage 152. Also, the update predictor 121 may receive object information including vertex information or object change information of the subsequent frame f2.

When vertex coordinates of an object are zeros, or when object change information is zero in the subsequent frame f2, the object may become extinct and disappear in the subsequent frame f2.

When the vertex coordinates of the object are not zeros, and when the object change information is not zero in the subsequent frame f2, the update predictor 121 may calculate the vertex coordinates of the object in the subsequent frame f2 based on transformation information of the object of the current frame f1. The update predictor 121 may calculate an intersecting area by projecting the calculated coordinates to the current frame f1. When the calculated intersecting area is different from an area of the current frame f1, the object to be processed may correspond to an object present in the current frame f1 and moving in the subsequent frame f2. In this instance, object data of an area including the object to be processed in the current frame f1 may disappear in the subsequent frame f2. The area including the object to be processed in the current frame f1 may include type B data.

When a vertex coordinate value to be located in the subsequent frame f2 is different from a vertex coordinate value in the current frame f1, and when a result, i.e., an area obtained by projecting the coordinate value matches or includes the area of the current frame f1, the corresponding object may be the dynamic object of which coordinates or a rotation varies. The area including the object to be processed may correspond to a type C area and thus may be processed as the type C area.

When the vertex coordinate value to be located the subsequent frame f2 matches the vertex coordinate value in the current frame f1, and when the projected area also matches, the corresponding object may be a static object. When change information includes color data change information, the corresponding area may be processed as a static object area. When coordinates and color do not vary, the area may be processed as a fixed object area.

Hereinafter, a method of processing an area including a type B object among dynamic objects will be described. Geometry data of the current frame f1 may include at least one of an area ID, a size of the area, coordinates of the area, an area type, an object ID intersecting the area, object data, transformation information provided in a matrix or animation path information, and data used for color calculation. The data used for color calculation may include color change information. Accordingly, the geometry information may include information regarding both a case where color data does not vary and a case where the color data varies.

The update predictor 121 may retrieve, from the geometry data of the current frame f1, an area including the object to be processed, and may predict the retrieved area as an update area. When the object to be processed is the type B object, the update predictor 121 may remove the object to be processed from predetermined objects, for example, a fixed object, a static object, or a dynamic object included in the update area, and thereby may change an object data set of the update area.

The data preparation unit 123 may extract, from the current frame f1 or the subsequent frame f2, rendering data of the update area where the object to be processed is removed. The data preparation unit 123 may extract the rendering data from the current frame f1 or the subsequent frame f2 based on information of the predicted update area. Information of the update area may be used as information to update only the predicted area. Information of the update area may include at least one of an area ID, a size of the update area, coordinates of the update area, an area type, an object ID intersecting the update area, object data, change information, and data used for color calculation.

Figure 3:
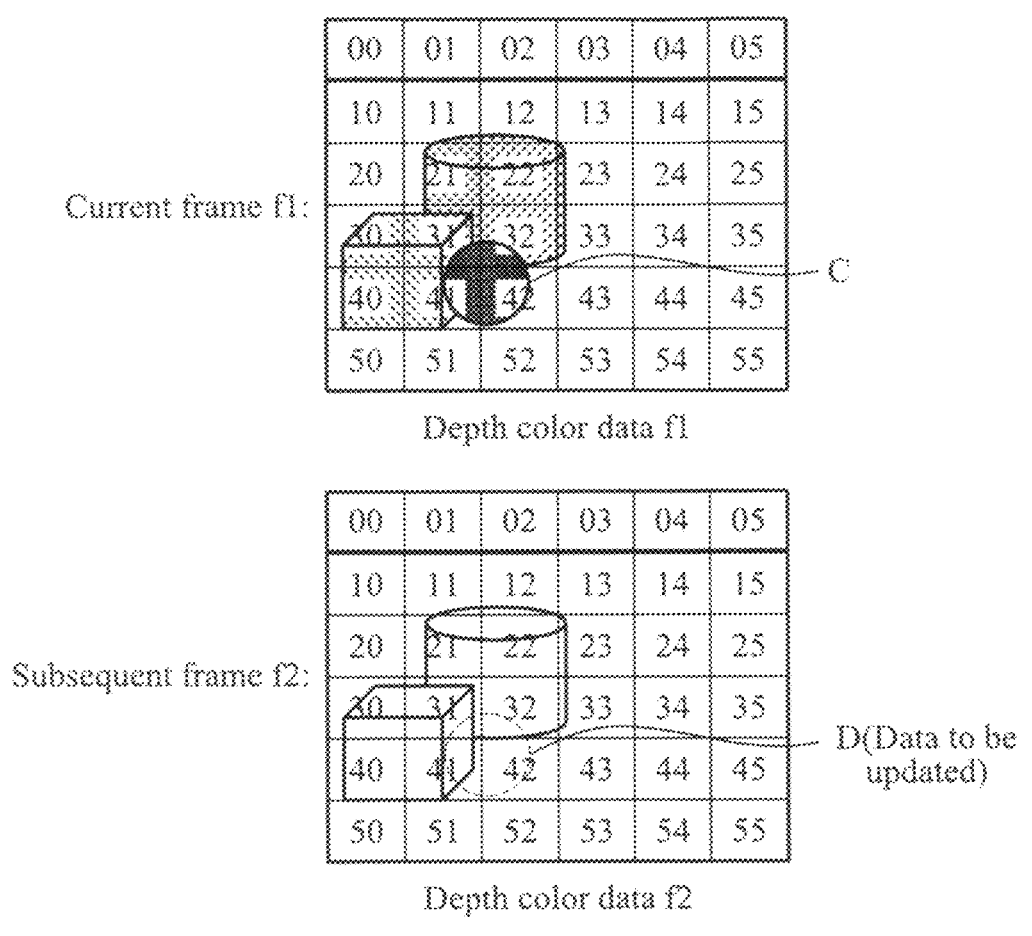

FIG. 3 illustrates an example of predicting an update area in an area where type B of an extinct object is present according to example embodiments. Referring to FIG. 3, in a current frame f1 and a subsequent frame f2, a dynamic object C is provided in a sphere and is absent in the subsequent frame f2.

When an object to be processed in the current frame f1 is verified as a dynamic object and includes change information, the update predictor 121 may calculate a coordinate value of the object in the subsequent frame f2 based on transformation information of the object. The update predictor 121 may calculate an intersecting area by projecting the calculated coordinate value to the current frame f1. When the intersecting area does not match, the update predictor 121 may determine the object to be processed, that is, the dynamic object C is present in the current frame f1 and is absent in the subsequent frame f2 as indicated by a dotted circle D, and may predict areas 31, 32, 41, and 42 including the dynamic object C as update areas. The update predictor 121 may remove a data set of the object to be processed from an object data set including the areas 31, 32, 41, and 42, and thereby may change the object data set of the update areas.

The data preparation unit 123 may prepare data used for rendering by extracting rendering data from geometry data of the current frame f1 based on information of the predicted areas 31, 32, 41, and 42. The prepared data may include at least one of an area ID, a size, and coordinates of an area including the object to be processed, an area type, object data intersecting the area, color transformation information that is data used for color calculation, and change information.

In the case of the type B object, geometry data of the object may not vary and thus the rendering unit 130 may perform rasterization of extracted object data of each area. Accordingly, geometry processing may be omitted in a rendering process.

When the object to be processed among objects of the current frame f1 is verified as a static object, the update preparation unit 121 may determine an area including the object to be processed as an update area, and may predict the update area from rendered data of the current frame f1.

Specifically, the update preparation unit 121 may receive, from the object storage 151, a type of the object to be processed, that is, the static object, an object ID, object data, or color change information. Since the object to be processed is verified as the static object, an area including the object to be processed may include type B object data. Color change information of the object may be change information regarding one of where a color value is directly changed, where a texture image is changed, and where a lighting component is changed.

The update predictor 121 may retrieve, from geometry data of the current frame f1, an area including the object to be processed, that is, the static object, and may predict the retrieved area as an update area.

The data preparation unit 123 may prepare rendering data of the predicted update area by extracting the rendering data from the current frame f1 or the current frame f2. The data preparation unit 123 may extract the rendering data from the current frame f1 or the subsequent frame f2 based on information of the update area.

Figure 4:
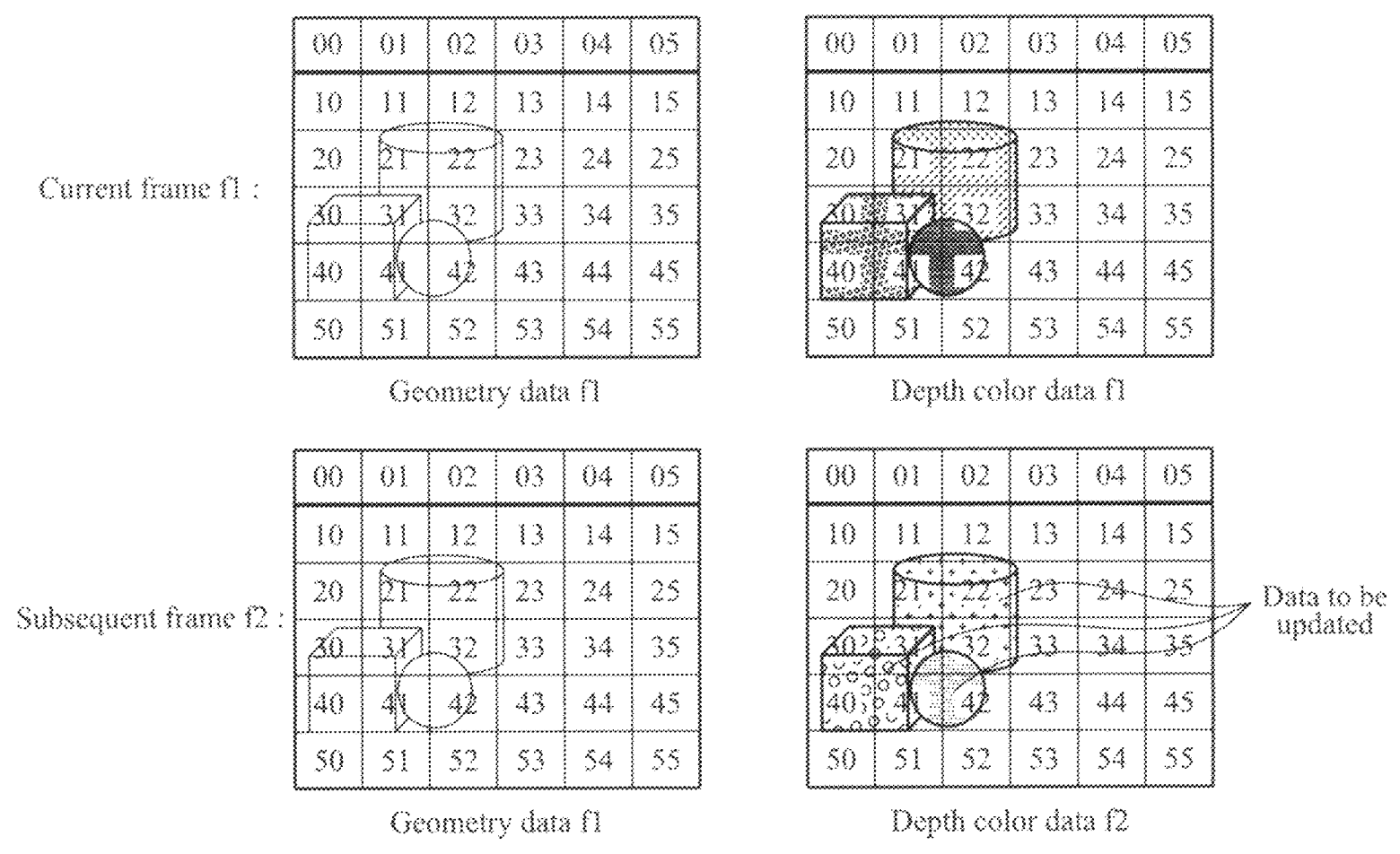

FIG. 4 illustrates an example of predicting an update area in an area where a static area is present according to example embodiments. Referring to FIG. 4, there is no change in geometry data of a current frame f1 and a subsequent frame f2. However, in the current frame f1 and the subsequent frame f2, a color value of the static object is varied due to lighting. When objects to be processed in the current frame f1 are verified as static objects, the update predictor 121 may predict areas 11, 12, 21, 22, 23, 30, 31, 32, 33, 40, 41, and 42, as update areas.

The data preparation unit 123 may prepare rendering data of the predicted areas 11, 12, 21, 22, 23, 30, 31, 32, 33, 40, 41, and 42 by extracting the rendering data from the geometry data of the current frame f1 based on information of the update areas. The prepared data may include at least one of an ID, a size, and coordinates of an area including the object to be processed, an area type, object data intersecting the area, and color change information.

In the case of the static object, geometry information of the object, for example, a location, a rotation, or coordinates of the object may not vary. Therefore, the rendering unit 130 may perform lighting and rasterization of extracted object data of each area. Accordingly, a transforming process may be omitted in the rendering process.

Figure 5:
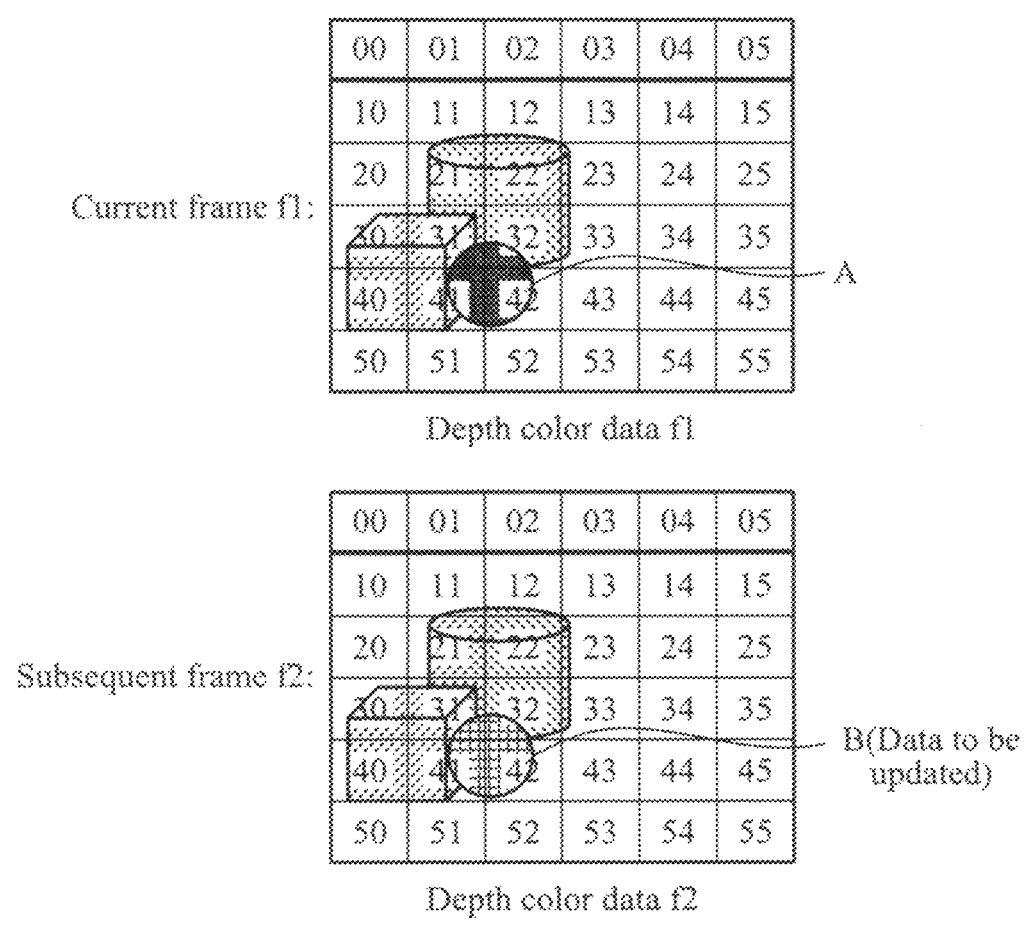

FIG. 5 illustrates an example of predicting an update area in an area where a static object is present according to example embodiments. Referring to FIG. 5, in a current frame f1 and a subsequent frame f2, a color value of the static object is varied according to a texture or a material characteristic. When an object to be processed in the current frame f1 is verified as the static object, the update predictor 121 may predict areas 31, 32, 41, and 42 including the object as update areas.

The data preparation unit 123 may prepare object data for rendering by extracting, from geometry data of the current frame f1, rendering data of the update areas based on information of the predicted areas 31, 32, 41, and 42. The prepared data may include at least one of an ID, a size, and coordinates of an area including the object to be processed, an area type, object data intersecting the area, and color change information.

In the case of the static object, geometry data of the object may not vary and thus the rendering unit 130 may perform rasterization of the extracted object data of each area.

Rendered data of all the update areas in the subsequent frame f2, generated during the aforementioned process, may be stored in the second geometry storage 156, the second depth storage 157, and the second color storage 158. When rendering of all the update areas is completed, a portion of geometry data of the current frame f1 stored in the first geometry storage 152 may be updated with rendering data of update areas of the subsequent frame f2, stored in the second geometry storage 156. Accordingly, geometry data of the subsequent frame f2 may be stored in the first geometry storage 152.

When rendering of all the update areas is completed, a portion of depth values of the current frame f1 stored in the first depth storage 153 and color values stored in the first color storage 154 may be updated with depth values and color values of update areas of the subsequent frame f2. Accordingly, the depth values of the subsequent frame may be stored in the first depth storage 153, and the color values of the subsequent frame f2 may be stored in the first color storage 154.

Data stored in the first geometry storage 152, the first depth storage 153, and the first color storage 154 may be reused for rendering results of the subsequent frame f2, and may be used to render only the update areas. Accordingly, it is possible to reduce an amount of time and an amount of calculation used for rendering.

Hereinafter, a rendering method using the 3D graphics rendering apparatus 100 configured as above will be described.

Figure 6:
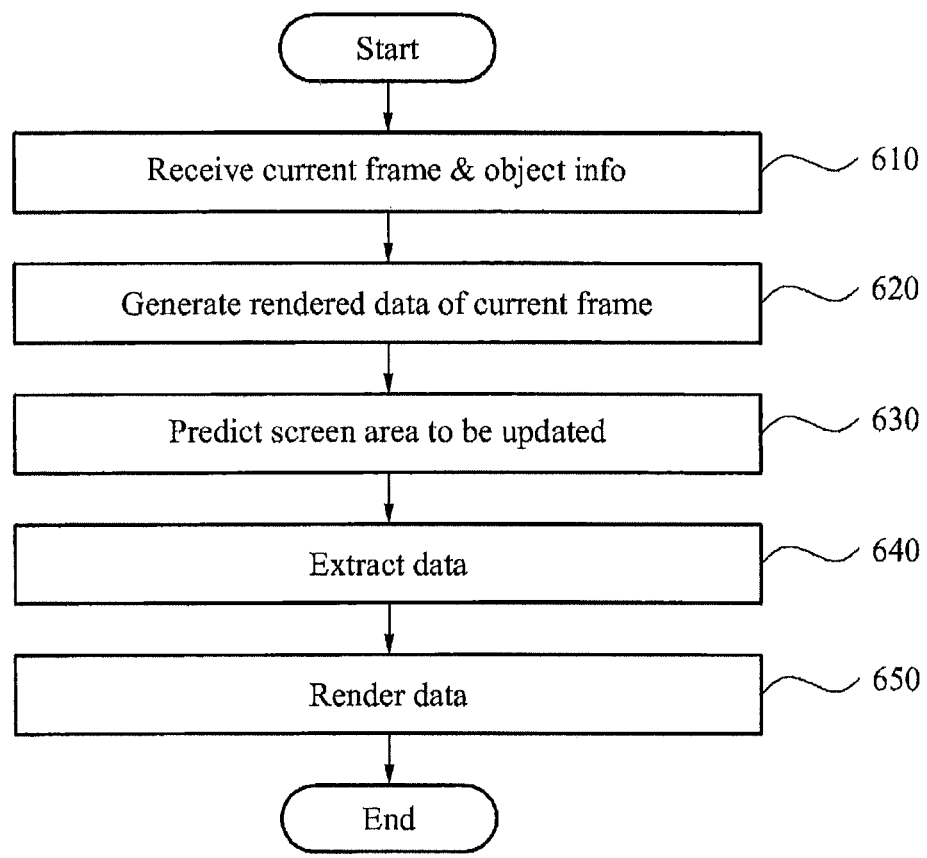
FIG. 6 illustrates a rendering method according to example embodiments.

FIG. 6 illustrates a rendering method according to example embodiments. The rendering method may be performed by the 3D graphics rendering apparatus 100 of FIG. 1.

In operation 610, a current frame and object information may be received. The object information may be information associated with objects forming the current frame.

In operation 620, rendered data of the current frame may be generated based on rendered data of a previous frame.

In operation 630, a screen area to be updated in a subsequent frame may be predicted based on the object information, the rendered data of the current frame, or object information of the subsequent frame.

In operation 640, rendering data of the predicted screen area may be extracted from the current frame or the subsequent frame.

In operation 650, the extracted rendering data may be rendered and be generated as an object included in an update area of the subsequent frame.

Figure 7:
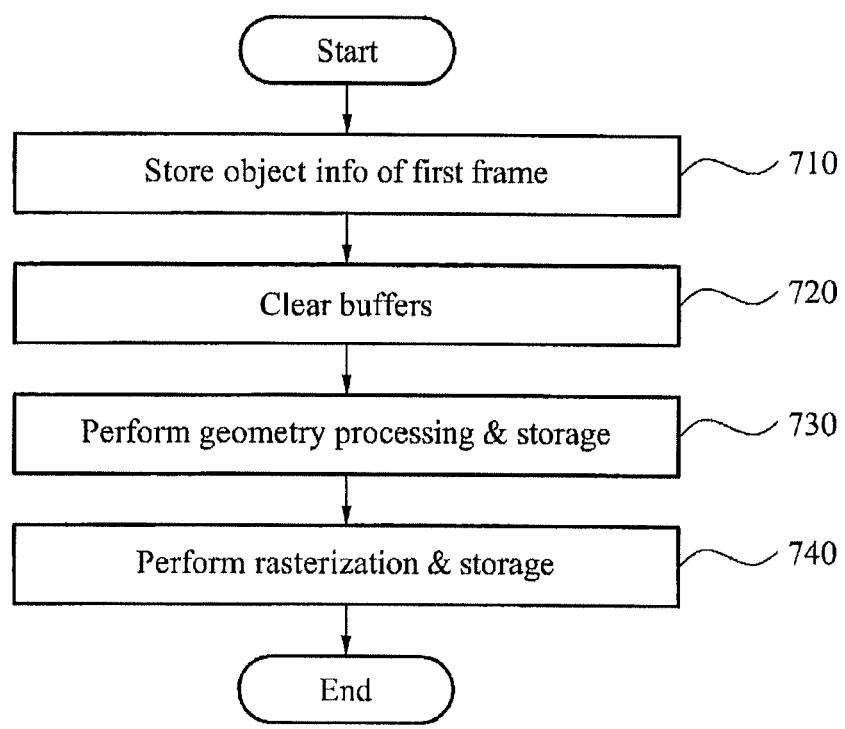
FIG. 7 illustrates a process of rendering a first frame in a rendering method according to example embodiments.

FIG. 7 illustrates a process of rendering a first frame in a rendering method according to example embodiments. Hereinafter, the first frame may be referred to as a current frame and a second frame may be referred to as a subsequent frame. However, this is only an example and various examples may be applicable.

When object information of the current frame is output from the application unit 110, the object storage 151 may store object information of the current frame in operation 710.

In operation 720, all the buffers of the memory 150, for example, the storages 152-158 may be cleared.

In operation 730, the geometry processor 131 may generate geometry data that is 2D triangle data by performing geometry processing of 3D objects forming the current frame, and may store the generated geometry data in the first geometry storage 152. Also, in operation 730, the generated geometry data may be distributed for each area by the area distributer 140 and be input into the first geometry storage 152.

In operation 740, the rasterization unit 133 may calculate a depth value and a color value of each pixel of the current frame by rasterizing the input 2D triangle data, and may store the calculated depth value and color value in the first depth storage 153 and the first color storage 154, respectively.

The rendering method may support a scheme of collecting geometry processing results and rendering an object for each area, that is, an area or tile-based rendering scheme, and a scheme of performing rendering based on an object unit, that is, an object-based rendering scheme.

Figure 8:
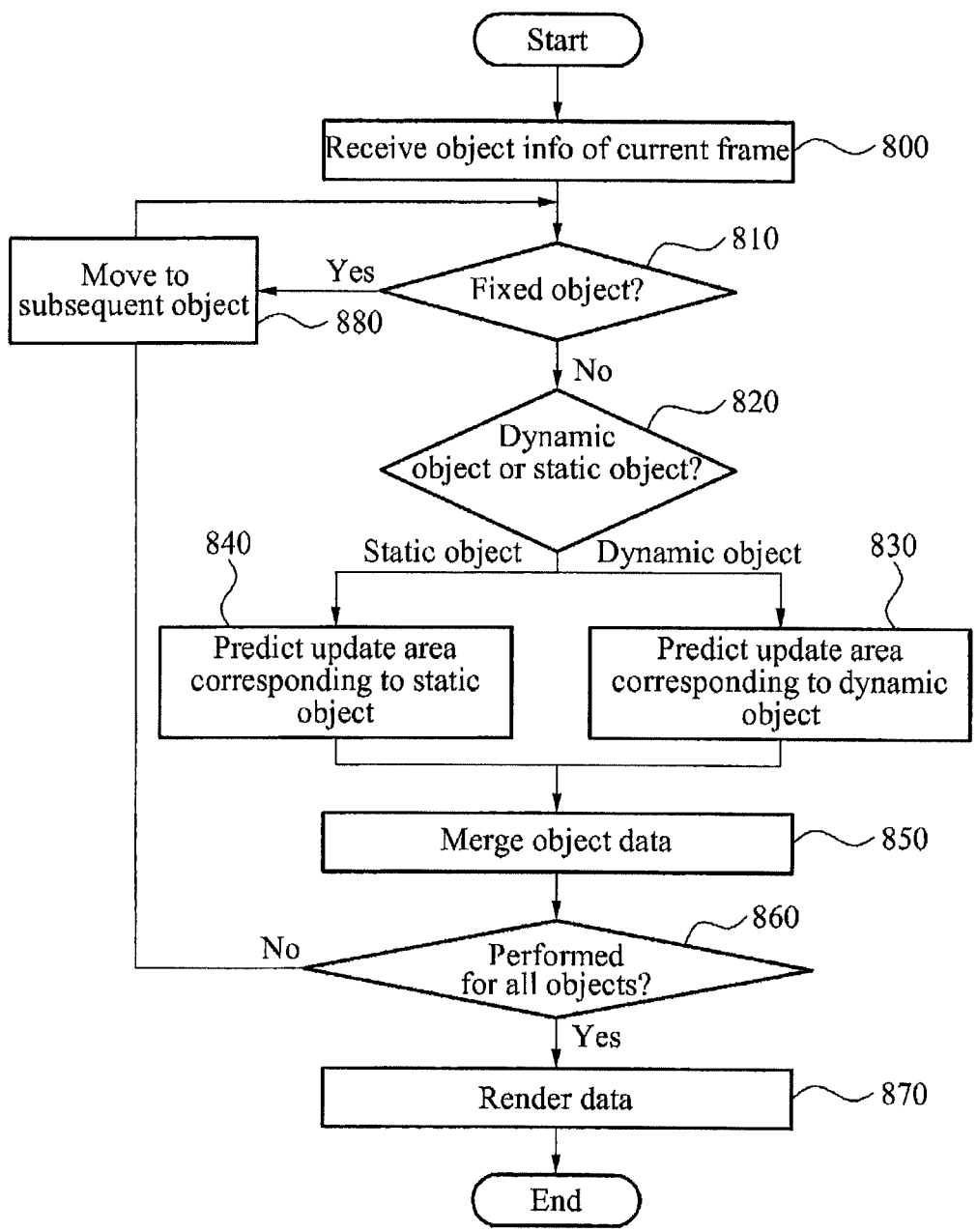
FIG. 8 illustrates a process of predicting an update area using a current frame in a rendering method according to example embodiments.

FIG. 8 illustrates a process of predicting an update area using a current frame in a rendering method according to example embodiments. The rendering method is performed based on an area unit.

In operation 800, object information of each object of the current frame, stored in the object storage 151, and geometric object data of the current frame stored in the first geometry storage 152 may be input into the update predictor 121. The object information may include at least one of an object type, object data, color change information, and geometric change information.

When a type of an object to be processed is verified as not being a fixed type in operation 810, it may be verified whether the object type is a dynamic object or a static object in operation 820.

When the object type is verified as the dynamic object in operation 820, the update predictor 121 may predict an update area corresponding to the dynamic object in operation 830.

When the object type is verified as the static object in operation 820, the update predictor 121 may predict an update area corresponding to the static object in operation 840.

Information of the update area predicted in operations 830 and 840 may be used to update only the corresponding predicted area, and may include at least one of an ID, a size, and coordinates of the update area, an area type, object data intersecting the update area, change information, and data used for color calculation.

In operation 850, the data preparation unit 123 may prepare rendering data by merging object data of update areas. Table 1 below shows an example of types of an object to be merged in a single update area, and prepared corresponding rendering data.

TABLE 1

| | Object type | Prepared rendering data |
|---|---|---|
| 1 | Generation object (e.g., ID N) The generation object may be a fixed object, a dynamic object, or a static object. | Object data (ID N) is added. |

TABLE 1-continued

| | Object type | Prepared rendering data |
|---|---|---|
| 2 | Fixed object (e.g., ID N) (e.g.: a case where the fixed object is initially generated) | Reuse rendering results (a geometry buffer, a depth buffer, a color buffer) corresponding to the fixed object (ID N) |
| 3 | Static object (e.g., ID N) (e.g.: a case where the static object of a previous frame matches geometry data calculation result, however a color varies) | Use geometry data corresponding to a static object (ID N) of a previous frame |
| 4 | Dynamic object (e.g., ID N) (e.g.: a case where geometry data of the dynamic object of a previous frame varies in the subsequent frame to include an area of the previous frame or to move to another area) | Add dynamic object data (ID N) |
| 5 | Extinct object (an object present in a previous frame, but absent in a subsequent frame. e.g., ID N) (e.g.: a case where an object is present in the previous frame, but is absent in the subsequent frame. The object may be a fixed object, a dynamic object, or a static object.) | Remove object data (ID N). Due to the removed object data, occluded data may be rendered. |

TABLE 2

| Type of object data to be rendered | Aspect of reusing calculation results of a previous frame | Aspect of rendering calculation amount | Object data corresponding to an area |
|---|---|---|---|
| Type A | May reuse all of geometry calculation result, a depth buffer, and a color buffer. | No additional calculation | Fixed object data |
| Type B | May reuse only geometry calculation result | Use a raster calculation | Static object data, extinct object data (object of a current frame in a dynamic object) |
| Type C | Reuse only geometry calculation result, or need geometry calculation. | Use a raster calculation, or a geometry calculation and the raster calculation | Dynamic object (object data included in an area of a subsequent frame where a changing object may be located), object data of an area where a generation object may be located |

When the update area is predicted with respect to all the objects in operation 860, the rendering unit 130 may render rendering data of the predicted update areas in operation 870.

Conversely, when the update area is not predicted with respect to all the objects in operation 860, operation 880 may be performed to move to a subsequent object. Accordingly, operations 810 to 880 may be performed.

Figure 9:
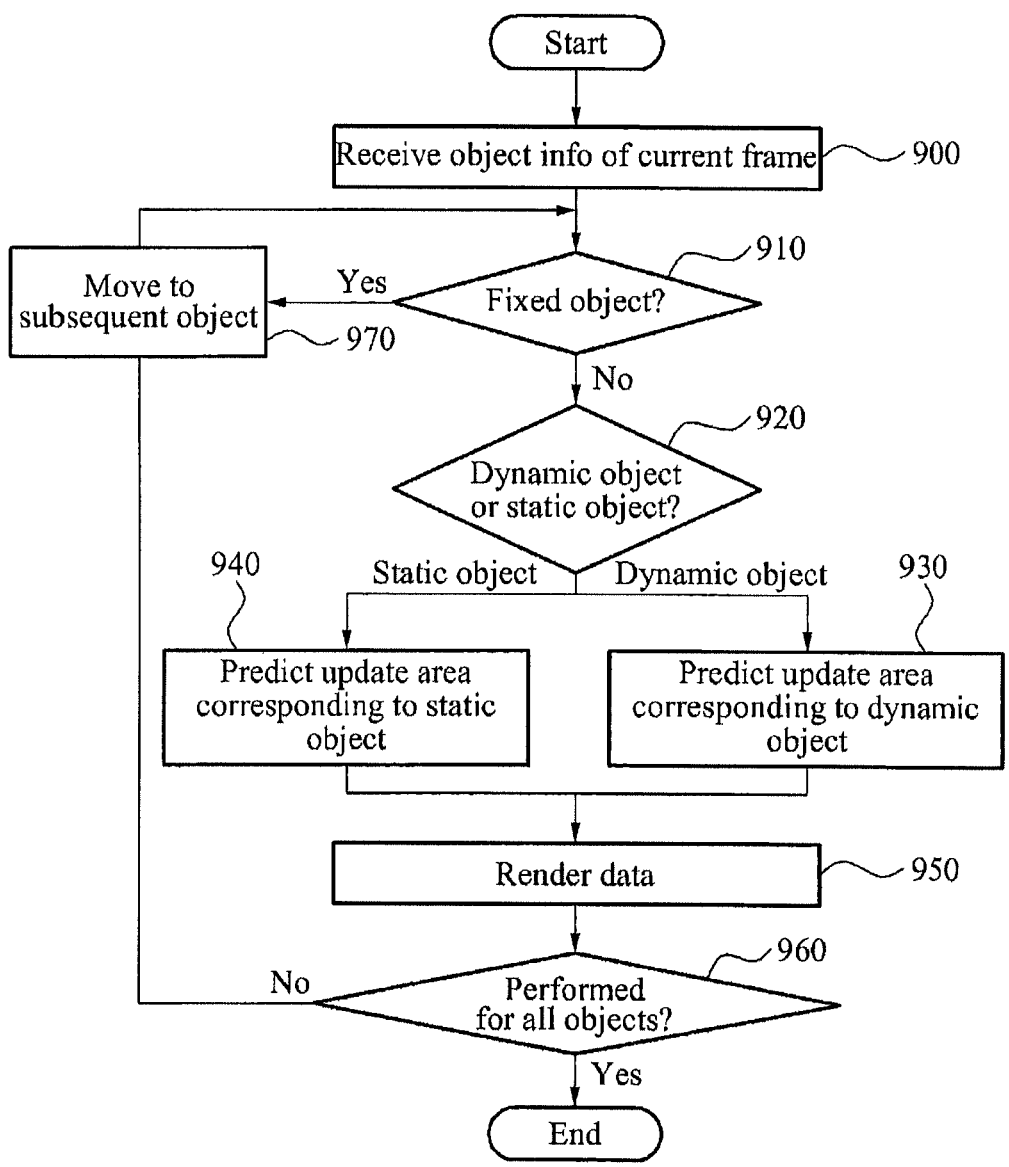
FIG. 9 illustrates a process of predicting an update area using a current frame in a rendering method according to example embodiments.

FIG. 9 illustrates a process of predicting an update area using a current frame in a rendering method according to example embodiments. The rendering method is based on an object unit and thus operations 900 to 940 may be the same as operations 800 to 840 of FIG. 8. Accordingly, further detailed descriptions related thereto will be omitted here.

In operation 950, the rendering unit 130 may render data of the update area based on the object unit.

When rendering is not completed with respect to all the objects in operation 960, operation 970 may be performed to move to a subsequent object and then operations 900 to 970 may be repeated.

Figure 10:
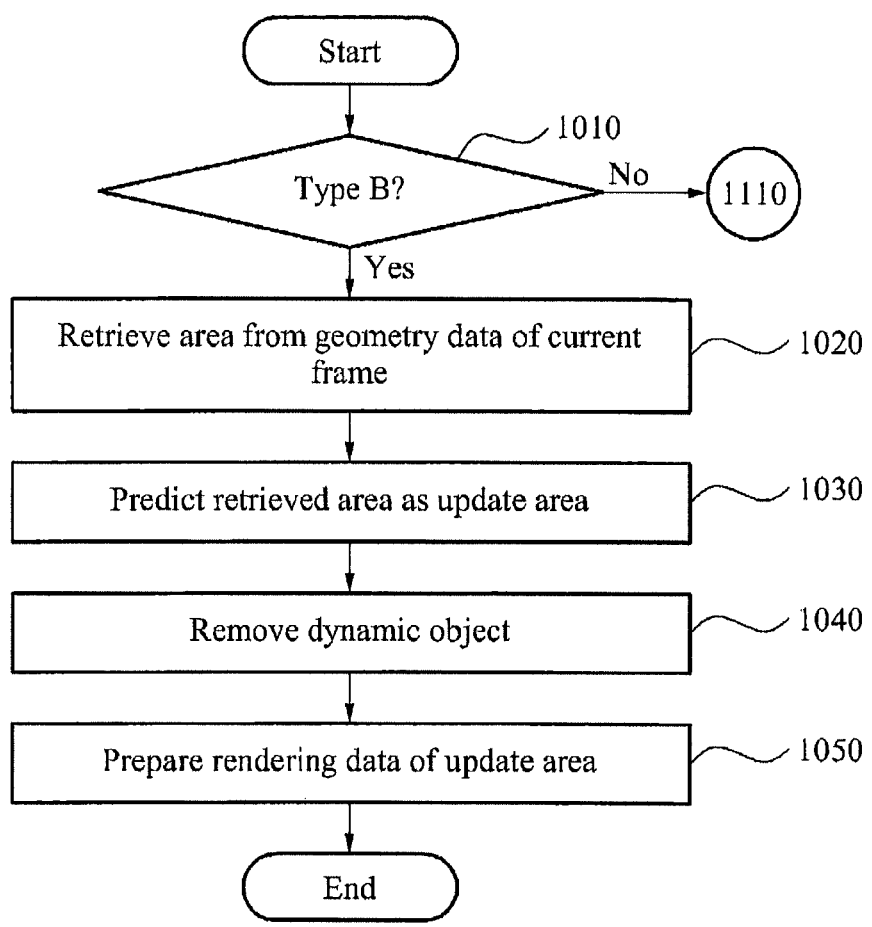
FIGS. 10 and 11 illustrate a process of preparing rendering data of a dynamic area according to example embodiments.

FIG. 10 illustrates a process of preparing rendering data of a dynamic area according to example embodiments.

In operation 1010, the update predictor 121 may verify whether an object to be processed among objects of a current frame corresponds to a type B of a dynamic object. The type B of the dynamic object may denote an object present in a previous frame, but absent in a subsequent frame.

When the object to be processed is verified as the type B of the dynamic object in operation 1010, the update predictor 121 may retrieve, from geometry data of the current frame, an area including the process to be processed, i.e., the dynamic object.

In operation 1030, the update predictor 121 may predict the retrieved area as an update area.

In operation 1040, the update predictor 121 may change an object set of the update area by removing the object to be processed, that is, the dynamic object from object data included in the update area.

In operation 1050, the data preparation unit 123 may extract, from the current frame or the subsequent frame, rendering data of the update area where the object to be processed is removed. Information of the update area may include at least one of an ID, a size, and coordinates of the update area, a type of the update area, an object ID intersecting the update area, object data, change information, and data used for color calculation.

Figure 11:
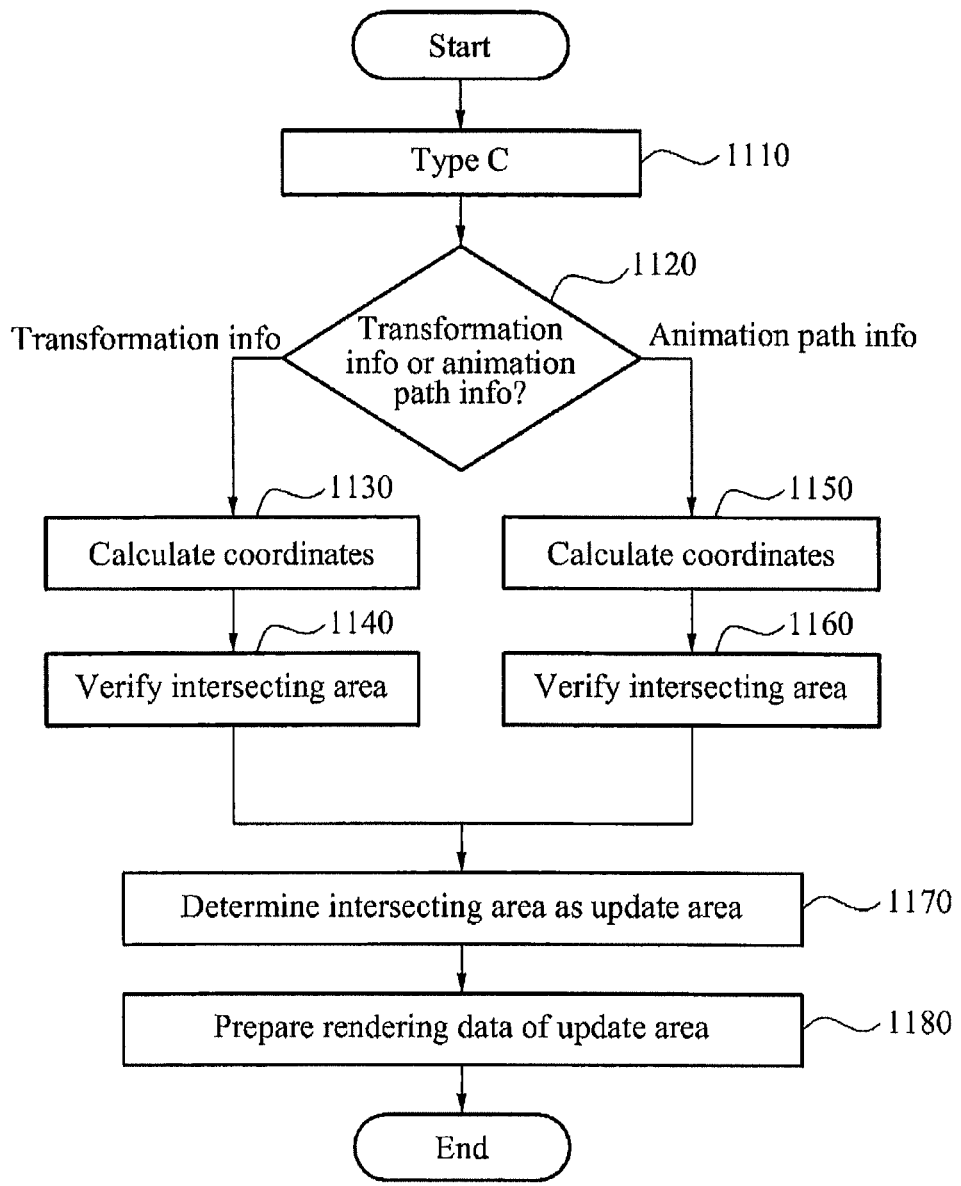

When the object to be processed is not verified as the type B of the dynamic object in operation 1010, the update predictor 121 may go to operation 1110 of FIG. 11.

FIG. 11 illustrates a process of preparing rendering data of a dynamic area according to example embodiments.

When a type of an object to be processed among objects of a current frame is verified as a type C in operation 1110, the update predictor 121 may verify whether change information of the object to be processed includes transformation information or animation path information in operation 1120. The type C object may be a dynamic object absent in a previous frame, and generated in a subsequent frame.

When the change information includes the transformation information in operation 1120, the update predictor 121 may calculate coordinates of the object in the subsequent frame based on the transformation information of the object in operation 1130.

In operation 1140, the update predictor 121 may verify an intersecting area by projecting the calculated coordinates to the current frame.

When the change information includes animation path information in operation 1120, the update predictor 1121 may calculate coordinates of the object in the subsequent frame based on a key value of animation path information in operation 1150.

In operation 1160, the update predictor 1121 may verify the intersecting area by projecting the calculated coordinates to the current frame.

In operation 1170, the update predictor 1121 may determine the verified intersecting area as an update area, and may predict the update area from geometry data of the current frame. An object disappearing in the subsequent frame is described above with reference to FIG. 10 and thus further detailed description will be omitted here.

In operation 1180, the data preparation unit 123 may prepare rendering data of the predicted update area. The data preparation unit 123 may extract the rendering data from the current frame or the subsequent frame based on information of the intersecting area.

Figure 12:
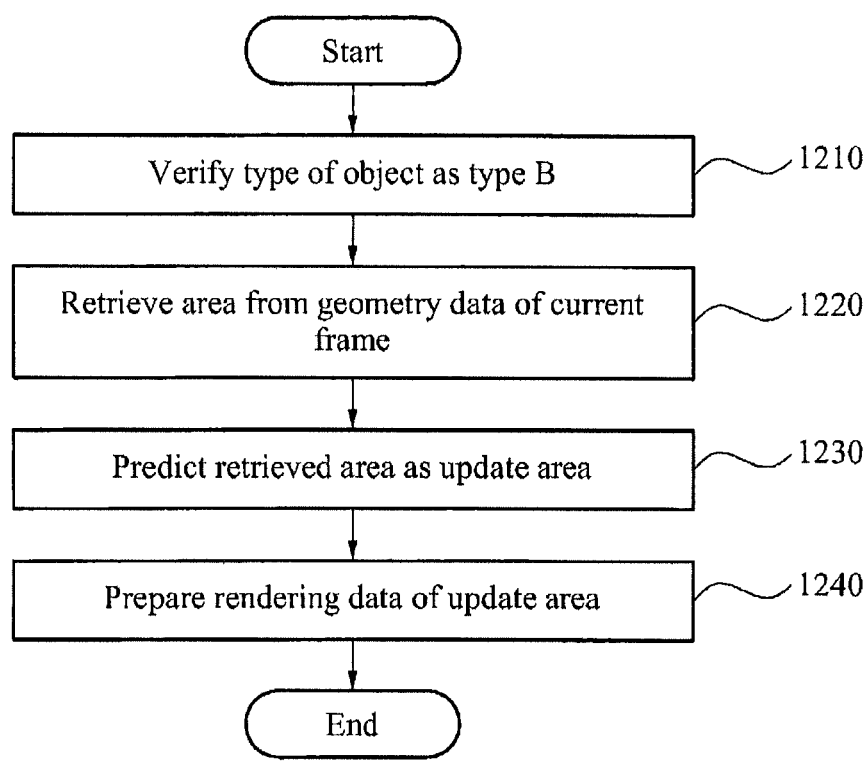
FIG. 12 illustrates a process of preparing rendering data of a static area according to example embodiments.

FIG. 12 illustrates a process of preparing rendering data in a static area according to example embodiments.

In operation 1210, the update predictor 121 may verify an object to be processed among objects of a current frame as a type B of a static object.

When the object is verified as the type B of the static object, the update predictor 121 may retrieve, from geometry data or depth data of the current frame, an area including the object to be processed, that is, the static object in operation 1220.

In operation 1230, the update predictor 121 may predict the retrieved area as an update area.

In operation 1240, the data preparation unit 123 may prepare rendering data of the update data by extracting the rendering data from the current frame or the subsequent frame.

Figure 13:
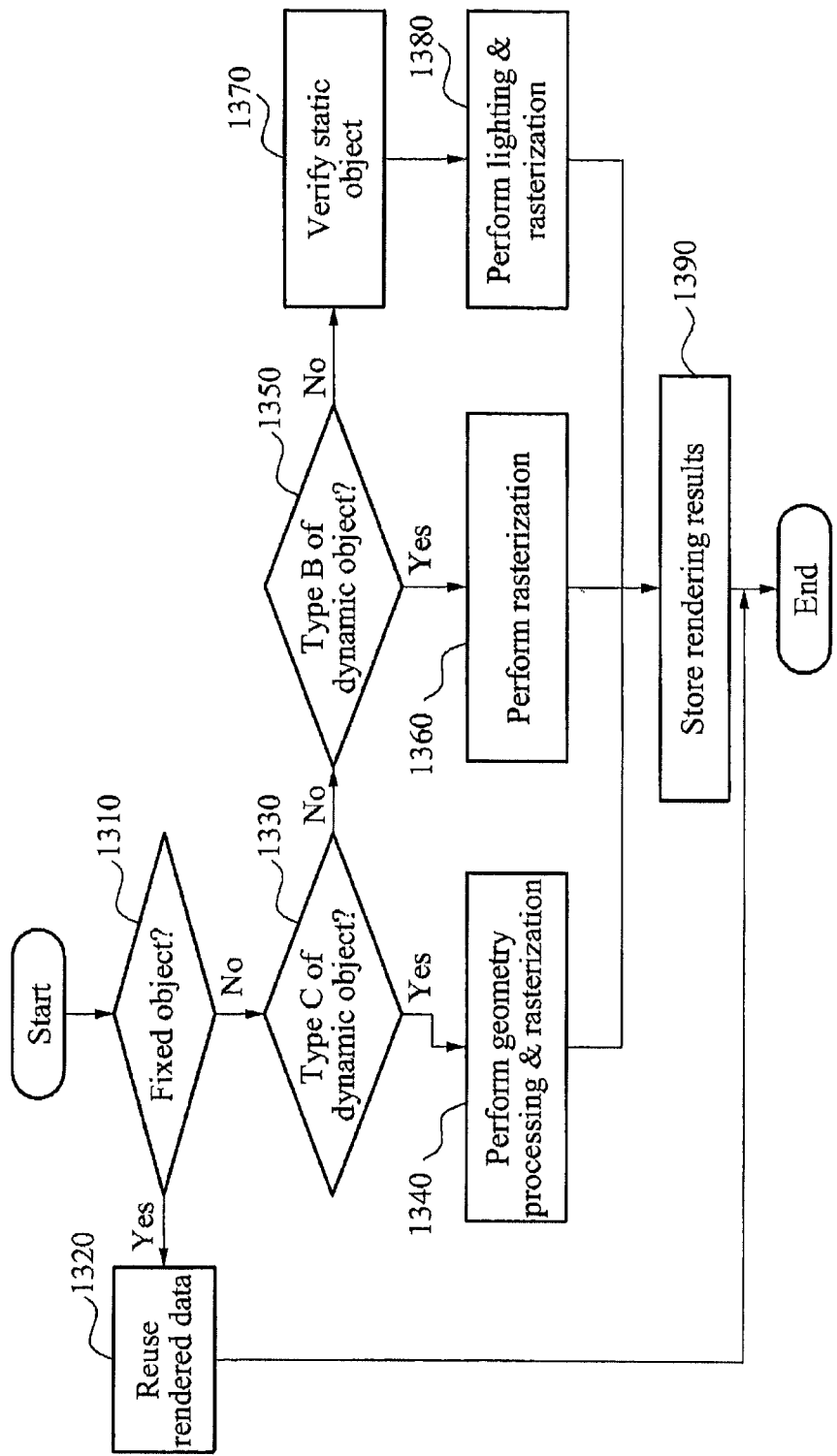
FIG. 13 illustrates a rendering method for each update area according to example embodiments.

FIG. 13 illustrates a rendering method of an update area according to example embodiments.

When an object to be processed is verified as a fixed object in operation 1310, an update area including the object to be processed may be displayed on the display panel 160 by reusing rendered data corresponding to an area including the fixed object among rendered data of the current frame in operation 1320.

When the object to be processed is verified as a type C of a dynamic object in operation 1330, the rendering unit 130 may perform transforming, lighting, viewport mapping, and rasterization of object data of an area to be changed in the current frame or the subsequent frame in operation 1340.

When the object to be processed is verified as a type B of a dynamic object in operation 1350, the rendering unit 130 may perform rasterization of object data in operation 1360. This is because there is no geometric change in the object data. Accordingly, geometry processing may be omitted in the rendering process.

When the object to be processed is verified as a type B of a static object in operation 1370, the rendering unit 130 may either perform lighting and rasterization, or perform rasterization of extracted data corresponding to the update area in operation 1380. Accordingly, geometry data may be reused and a color value of each pixel may vary.

In operation 1390, rendering results obtained in operations 1340, 1360, and 1380 may be stored in the second geometry storage 156, the second depth storage 157, and the second color storage 158.

FIG. 14 illustrates a method of classifying an object type according to example embodiments. The method may be performed by the application unit 110 or a separate block (not shown) before the update predictor 121 included in the update preparation unit 120.

When an input frame is not a first frame in operation 1405, an object to be processed in a subsequent frame may be compared with an object processed in a current frame in operation 1410. Data input in operation 1405 may include object information and scene information, for example, a number of frames, viewpoint information, a scene graph, or a shader program.

When an ID of the object to be processed in the subsequent frame matches an ID of the object processed in the current frame in operation 1415, it may be determined whether the object to be processed in the subsequent frame is absent in the subsequent frame in operation 1420. Specifically, in operation 1420, it may be determined whether the object to be processed in the subsequent frame disappears in the subsequent frame by verifying whether object transformation information or object data of the subsequent frame is zero in the subsequent frame.

When object data, for example, a vertex coordinate value of the subsequent frame is zero in the subsequent frame, or when object transformation information of the subsequent frame is zero in the subsequent frame, the object to be processed in the subsequent frame may be determined to disappear, i.e., be absent in the subsequent frame. In operation 1425, the object to be processed may be determined and set as an extinct object.

When the object to be processed is determined to be present in operation 1420, it may be determined whether a dynamic change occurs in the object to be processed in operation 1430.

When the dynamic change is determined to occur in operation 1430, the object to be processed may be determined as a dynamic object in operation 1435.

The dynamic object may be determined based on the following three cases:

a first case where object data, for example, the vertex coordinate value of the subsequent frame matches object data, for example, the vertex coordinate value of the current frame, and geometric transformation information of object data of the subsequent frame is different from geometric transformation information of object data of the current frame;

a second case where object data of the subsequent frame is different from object data of the current frame, and geometric transformation information of object data of the subsequent frame matches geometric transformation information of object data of the current frame; and a third case where object data of the subsequent frame is different from object data of the current frame, and geometric transformation information of object data of the subsequent frame is different from geometric transformation information of object data of the current frame.

When the dynamic change is determined to not occur in the object to be processed in operation 1430, it may be determined whether a static change occurs in the object to be processed in operation 1440. Specifically, when the first case is satisfied, geometric transformation information of object data of the subsequent frame matches geometric transformation information of object data of the current frame, and color change information of object data of the subsequent frame is different from color change information of object data of the current frame, the static change may occur.

Accordingly, the object to be processed may be determined and set as the static object in operation 1445.

When the object to be processed in the subsequent frame does not disappear in the subsequent frame in operation 1420 and the dynamic change and the static change do not occur in the object to be processed in operation 1447, the object to be processed may be determined and set as a fixed object in operation 1450.

When the static change is determined to not occur in the object to be processed in operation 1440, the object to be processed may be determined and set as the fixed object in operation 1450. Specifically, when object data, for example, the vertex coordinate value of the subsequent frame matches object data, for example, the vertex coordinate value of the current frame geometric transformation information of object data of the subsequent frame matches geometric transformation information of object data of the current frame, and color change information of object data of the subsequent frame matches color change information of object data of the current frame, the object to be processed may be determined as the fixed object.

When the object IDs are different from each other in operation 1415, it may be determined whether the object to be processed in the subsequent frame corresponds to an object absent in the current frame, i.e., a new object in operation 1455.

When the object to be processed is determined as the new object in operation 1455, a type of the object to be processed may be set as a generation object in operation 1460.

When the object to be processed is not determined as the new object in operation 1455, another object of the subsequent frame may be set as an object to be processed in operation 1465 and go to operation 1410.

When the input frame is the first frame in operation 1405, operation 1460 may be performed.

In operation 1470, the update preparation unit 120 may prepare an update using the object set in each of operations 1425, 1435, 1445, 1450, and 1460.

In operation 1475, the rendering unit 130 may perform rendering with respect to the prepared object. Rendered data may be stored and updated in the memory 150, and be displayed on the display panel 1460.

The aforementioned process may be repeated until processing is completed with respect to all the objects in operation 1480.

The above-described exemplary embodiments may be recorded in non-transitory computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although exemplary embodiments have been shown and described, it should be appreciated by those skilled in the art that changes may be made in these exemplary embodiments without departing from the principles and spirit of the disclosure, the scope of which is defined by the claims and their equivalents.

What is claimed is:

1. An apparatus for rendering three-dimensional (3D) graphics, comprising:
    a processor to control one or more processor-executable units;
    a rendering unit to generate rendered data of a current frame based on rendered data of a previous frame; and
    an update preparation unit to predict a screen area to be updated in a subsequent frame based on at least one of object information associated with objects forming the current frame, the rendered data of the current frame, and object information of the subsequent frame, and to extract, from one of the current frame and the subsequent frame, rendering data of the predicted screen area,
    wherein the rendering unit renders the extracted rendering data to generate the predicted screen area to be updated in the subsequent frame,
    wherein the update preparation unit determines a type of the object to be processed among objects in the current frame as one of a dynamic object, a static object, and a fixed object based on at least one of vertex coordinate value, geometric transformation information and color change information of the object in the current frame and the subsequent frame,
    wherein when the type of the object is a dynamic object, the rendering unit determines whether a new geometry calculation must be performed for the subsequent frame or if a geometry calculation may be reused in the subsequent frame,
    wherein when the type of the object is a static object, the geometry calculation may be reused in the subsequent frame,
    wherein when the type of the object is a fixed object, the geometry calculation, a depth buffer, and a color buffer may be reused in the subsequent frame, and
    wherein a new raster calculation is performed when the type of the object is a dynamic object or a static object.

2. The apparatus of claim 1, wherein when the ID of the object to be processed in the subsequent frame matches the ID of the object processed in the current frame and the object to be processed is determined to be present in the subsequent frame, and a dynamic change occurs in the object, the type of the object is determined to be the dynamic object, and the screen area to be updated in the subsequent frame is predicted as an area including the object to be processed in both the current frame and the subsequent frame, wherein when the ID of the object to be processed in the subsequent frame matches the ID of the object processed in the current frame and the object to be processed is determined to be present in the subsequent frame, and a static change occurs in the object, the type of the object is determined to be the static object, and the screen area to be updated in the subsequent frame is predicted as an area including the object to be processed in one of the current frame and the subsequent frame, wherein when the ID of the object to be processed in the subsequent frame matches the ID of the object processed in the current frame and the object to be processed is determined to be present in the subsequent frame, and the dynamic change and the static change do not occur, the type of the object is determined to be the fixed object, wherein when the ID of the object to be processed in the subsequent frame and the ID of the object processed in the current frame are different from each other and the object to be processed in the subsequent frame corresponds to an object absent in the current frame, the type of the object is determined to be a generation object, and the screen area to be updated in the subsequent frame is predicted as an area including the object to be processed in the subsequent frame, wherein when the ID of the object to be processed in the subsequent frame matches the ID of the object processed in the current frame and the object to be processed in the subsequent frame is absent in the subsequent frame, the type of the object is determined to be an extinct object, and the screen area to be updated in the subsequent frame is predicted as an area including the object to be processed in the current frame.

3. The apparatus of claim 1, wherein the update preparation unit comprises:
an update predictor to predict, from the rendered data of the current frame, an update area corresponding to an object to be processed among the objects of the current frame, when the object to be processed corresponds to a dynamic object of which one of vertex coordinates, a vertex position, and a vertex rotation varies; and
a data preparation unit to extract rendering data of the update area from one of the current frame and the subsequent frame.

4. The apparatus of claim 3, wherein:
when the object to be processed corresponds to an object present in the current frame and absent in the subsequent frame, the update predictor removes the object to be processed from objects included in the update area, and
the data preparation unit extracts, from one of the current frame and the subsequent frame, the rendering data of the update area in which the object to be processed is removed.

5. The apparatus of claim 4, wherein the rendering unit performs rasterization of the rendering data extracted by the data preparation unit.

6. The apparatus of claim 3, wherein:
when the object to be processed corresponds to a dynamic object having geometry data that varies in the subsequent frame, the update predictor calculates an area of the object to be processed in the subsequent frame based on change information of the object to be processed, and
the data preparation unit extracts rendering data of the calculated area from one of the current frame and the subsequent frame.

7. The apparatus of claim 6, wherein the rendering unit performs geometry processing and rasterization of data based on the rendering data extracted by the data preparation unit and change information of the object to be processed.

8. The apparatus of claim 6, wherein the change information of the object to be processed includes one of animation path information and transformation information indicating a change between the current frame and the subsequent frame.

9. The apparatus of claim 1, wherein the geometric transformation information includes information regarding coordinates, a location, or a rotation of an object varying in the subsequent frame, and
wherein the color change information includes information regarding a color value, a texture image, or a lighting component of an object varying in the subsequent frame.

10. The apparatus of claim 9, further comprising:
an area distributer to classify the geometrically processed data into areas by performing tile binning of the geometrically processed data, and to output the classified geometrically processed data to the storage.

11. The apparatus of claim 1, wherein the update preparation unit comprises:
an update predictor to predict, from the rendered data of the current frame, an update area corresponding to an object to be processed among the objects of the current frame, when the object to be processed corresponds to a static object of which one of a color, a texture, and a brightness varies; and
a data preparation unit to extract rendering data of the update area from one of the current frame and the subsequent frame.

12. The apparatus of claim 11, wherein the update predictor retrieves an area including the static object from the rendered data of the current frame, and predicts the retrieved area as the update area.

13. The apparatus of claim 12, wherein the rendering unit performs rasterization and optionally lighting, of the rendering data extracted by the data preparation unit.

14. The apparatus of claim 1, wherein the rendering data is applied to one of an object-based rendering scheme of performing rendering based on an object unit and an area and a tile-based rendering scheme of gathering geometrical processing results of the objects, to perform rendering for each area.

15. The apparatus of claim 1, wherein the update preparation unit comprises:
an update predictor to determine, as a generation object, an object absent in the current frame and newly generated in the subsequent frame, and to predict an update area of the subsequent frame based on change information of an object of the subsequent frame; and
a data preparation unit to extract, from the subsequent frame, and prepare rendering data of the predicted update area.

16. The apparatus of claim 15, wherein:
the update predictor determines, as a generation object, an object newly generated in the subsequent frame, and calculates an area of the generation object in the subsequent frame based on change information of the object of the subsequent frame, and the data preparation unit extracts, from the subsequent frame, rendering data of the calculated area.

17. The apparatus of claim 16, wherein the rendering unit performs geometry processing and rasterization of data based on the rendering data extracted by the data preparation unit and change information of the object to be processed.

18. The apparatus of claim 1, wherein an area corresponding to one of a fixed object and an unchanged object reuses the rendered data of the previous frame.

19. The apparatus of claim 1, wherein the object information comprises at least one of an object identifier (ID), an object type, object data, and change information of the object data.

20. A method of rendering 3D graphics, comprising:
receiving a current frame and object information associated with objects forming the current frame;
generating rendered data of the received current frame based on rendered data of a previous frame;
determining a type of the object to be processed among objects in the current frame as one of a dynamic object, a static object, and a fixed object based on at least one of vertex coordinate value, geometric transformation information and color change information of the object in the current frame and the subsequent frame;
predicting a screen area to be updated in the subsequent frame, based on at least one of the received object information of the current frame, the rendered data of the current frame, and object information of the subsequent frame;
extracting, from one of the current frame and the subsequent frame, rendering data of the predicted screen area; and
rendering the extracted rendering data to generate the predicted screen area to be updated in the subsequent frame,
wherein when the type of the object is a dynamic object, the extracting comprises determining whether a new geometry calculation must be performed for the subsequent frame or if a geometry calculation may be reused in the subsequent frame,
wherein when the type of the object is a static object, the geometry calculation may be reused in the subsequent frame,
wherein when the type of the object is a fixed object, the geometry calculation, a depth buffer, and a color buffer may be reused in the subsequent frame, and
wherein a new raster calculation is performed when the type of the object is a dynamic object or a static object.

21. The method of claim 20, wherein when the ID of the object to be processed in the subsequent frame matches the ID of the object processed in the current frame and the object to be processed is determined to be present in the subsequent frame, and a dynamic change occurs in the object, the type of the object is determined to be the dynamic object, and the screen area to be updated in the subsequent frame is predicted as an area including the object to be processed in both the current frame and the subsequent frame,
wherein when the ID of the object to be processed in the subsequent frame matches the ID of the object processed in the current frame and the object to be processed is determined to be present in the subsequent frame, and a static change occurs in the object, the type of the object is determined to be the static object, and the screen area to be updated in the subsequent frame is predicted as an area including the object to be processed in one of the current frame and the subsequent frame,
wherein when the ID of the object to be processed in the subsequent frame matches the ID of the object processed in the current frame and the object to be processed is determined to be present in the subsequent frame, and the dynamic change and the static change do not occur, the type of the object is determined to be the fixed object.

22. The method of claim 21, wherein:
the predicting comprises removing the object to be processed from objects included in the update area when the object to be processed corresponds to an object present in the current frame and absent in the subsequent frame, and
the extracting comprises extracting, from one of the current frame and the subsequent frame, the rendering data of the update area in which the object to be processed is removed.

23. The method of claim 22, wherein the rendering comprises performing rasterization of the extracted rendering data.

24. The method of claim 21, wherein:
the predicting comprises calculating an area of the object to be processed in the subsequent frame based on change information of the object to be processed, when the object to be processed corresponds to a dynamic object of which geometry data varies in the subsequent frame, and
the extracting comprises extracting rendering data of the calculated area from one of the current frame and the subsequent frame.

25. The method of claim 24, wherein the rendering comprises performing geometry processing and rasterization of data based on the extracted rendering data and change information of the object to be processed.

26. The method of claim 21, wherein the predicting comprises retrieving, from the rendered data of the current frame, an area including a static object of which one of a color, a texture, and a brightness varies, when the object to be processed corresponds to the static object, and predicting the retrieved area as the update area, and
the extracting comprises extracting rendering data of the calculated area from one of the current frame and the subsequent frame.

27. The method of claim 25, wherein the rendering comprises performing rasterization and optionally lighting, of the extracted rendering data.

28. The method of claim 20, wherein the predicting comprises determining, as a generation object, an object absent in the current frame and newly generated in the subsequent frame, to predict an update area of the subsequent frame based on change information of an object of the subsequent frame.

29. The method of claim 28, wherein:
the predicting comprises determining, as a generation object, an object newly generated in the subsequent frame to calculate an area of the generation object in the subsequent frame based on change information of the object of the subsequent frame, and
the extracting comprises extracting, from the subsequent frame, rendering data of the calculated area.

30. The method of claim 29, wherein the rendering comprises performing geometry processing and rasterization of data based on the extracted rendering data and change information of the object to be processed.

31. The method of claim 20, wherein an area corresponding to one of a fixed object and an unchanged object reuses the rendered data of the previous frame.

32. The method of claim 20, wherein the predicting comprises predicting, from the rendered data of the current frame, an update area corresponding to an object to be processed among the objects of the current frame, when the object to be processed corresponds to a dynamic object of which one of vertex coordinates, a vertex position, and a vertex rotation varies.

33. At least one non-transitory computer-readable recording medium comprising computer-readable instructions that control at least one processor to implement the method of claim 20.

* * * * *